Dec. 20, 1938.    W. T. WELCH    2,140,975
CLUTCH MECHANISM
Filed Oct. 27, 1936    2 Sheets-Sheet 1
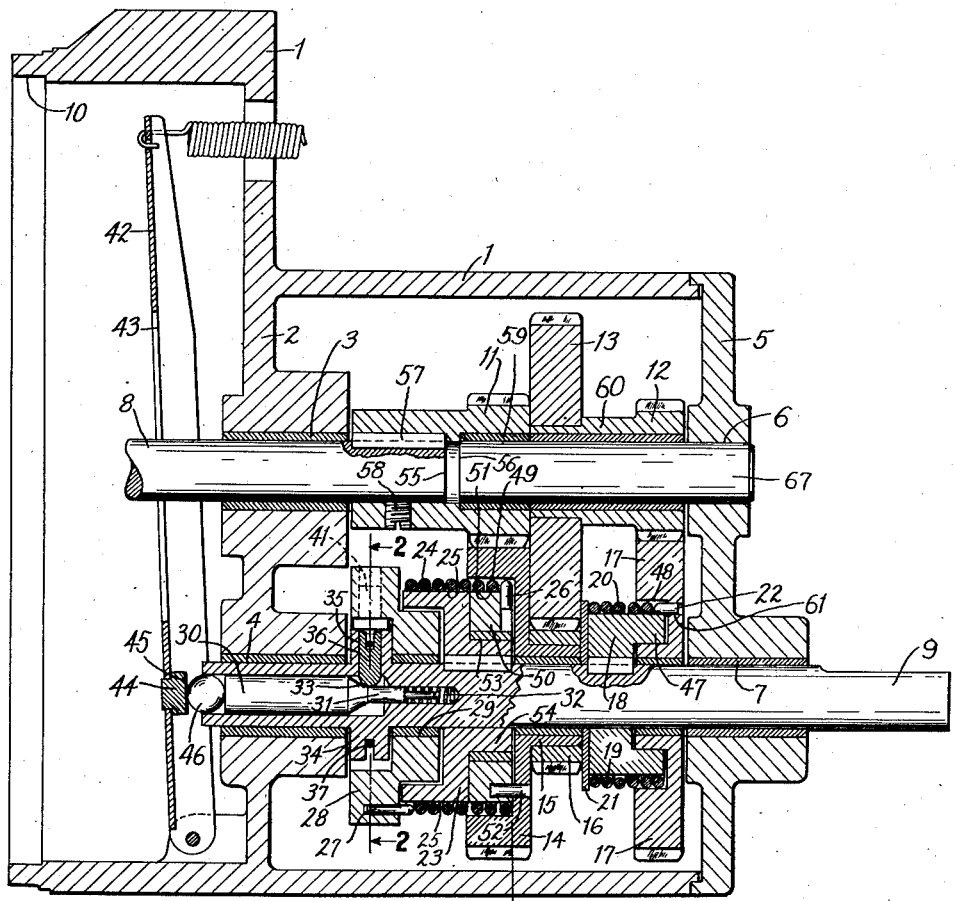
FIG.1.
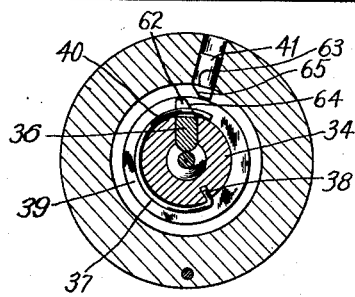
FIG.2.
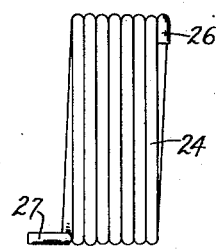
FIG.3.
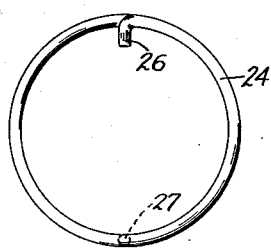
FIG. 4.
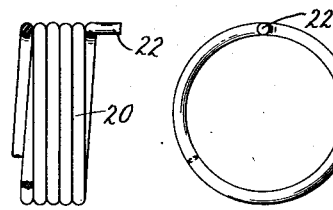
FIG.5    FIG. 6.
INVENTOR.
WILLIAM T. WELCH,
BY 
ATTORNEY.

Dec. 20, 1938.   W. T. WELCH   2,140,975

CLUTCH MECHANISM

Filed Oct. 27, 1936    2 Sheets-Sheet 2

INVENTOR.
WILLIAM T. WELCH,
BY *Slough and Canfield*
ATTORNEY.

Patented Dec. 20, 1938

2,140,975

UNITED STATES PATENT OFFICE 2,140,975

CLUTCH MECHANISM

William T. Welch, Westfield, N. Y.

Application October 27, 1936, Serial No. 107,867

6 Claims. (Cl. 192—48)

This invention relates to clutch mechanisms and more particularly to an improved clutch mechanism of the coil spring type.

Heretofore power-transmission mechanisms have been proposed through which the power of a motor or other source may be transmitted to a load to be driven; and such transmission mechanisms have comprised gearing by means of which the delivered speed may be different from that of the source, and clutches operating in conjunction with the gearing by which the delivered speed may be varied.

It is the primary object of this invention to provide generally an improved clutch arrangement particularly adapted to transmission mechanisms of the above type.

Other objects are:

To provide an improved clutch mechanism of the coil spring type, rotatably inter-connecting a pair of shafts;

To provide an overrunning clutch construction for power transmissions having an improved mode of operation;

To provide in a clutch of the coil spring type an improved mounting for the clutch spring to render the same more durable in use and to prevent breakage thereof;

To provide a speed-change transmission comprising a coil spring type clutch and having improved means to effect operation of the clutch with the minimum of clutch operating force or pressure;

To provide generally an improved clutch construction adaptable to be used in speed-change power-transmissions.

Other objects will be apparent to those skilled in the art to which my invention appertains.

My invention is fully disclosed in the following description taken in connection with the accompanying drawings in which:

Fig. 1 is a longitudinal sectional view illustrating an embodiment of my invention in its preferred form;

Fig. 2 is a fragmentary cross sectional view taken from the plane 2—2 of Fig. 1;

Figs. 3 and 4 are respectively side elevational and end elevational views of a clutch spring element illustrated in longitudinal section in Fig. 1;

Figs. 5 and 6 are respectively side elevational and end elevational views of another clutch spring element illustrated in longitudinal section in Fig. 1;

Figure 8:
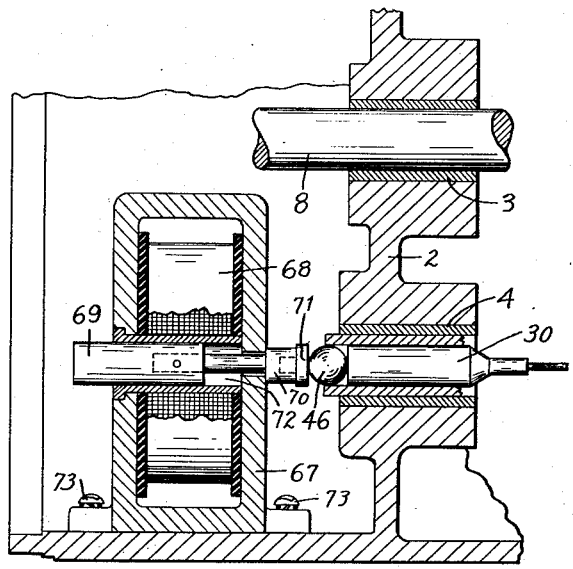
Fig. 8 is a view illustrating a modification of the clutch operating mechanism shown in Fig. 1.

Referring to the drawings, I have shown generally at 1 an enclosing housing preferably formed from cast metal having a transverse wall 2 therein in which are formed sleeve bearings 3 and 4 parallel and spaced apart. The housing has an outer end wall 5 preferably in the form of a removable housing cover portion in which is provided a sleeve bearing 7 axially aligned with the bearing 4. A driven shaft 9 is rotatable in the aligned bearings 4 and 7. The shaft 9 extends outwardly through the housing end cover 5 and is intended to be keyed, coupled or otherwise connected to the apparatus or other load to be driven. The shaft 8 preferably constitutes an extension on or is constructed to be coupled to the drive shaft of the power supplying motor. Preferably an electric motor will be utilized as the source of power and, in such cases, the housing 1 is provided with an annular open end as indicated at 10 formed to be fitted upon the motor housing, and when viewed in this aspect, the housing 1 may be substituted for the usual end bell of the electric motor.

This arrangement is not essential however to the present invention, inasmuch as the housing 1 may be supported in any suitable manner by which power from the supply motor may be applied to turn the shaft 8 at the speed of the power source.

A stub shaft 67 is press fitted into a bore 6 in the housing end cover 5 in axial alignment with the driving shaft 8, the driving shaft projecting outwardly from the bearing 3 a suitable distance, terminating as at 55, and the stub shaft 67 terminates adjacent thereto as at 56 in confronting relation thereto.

A pinion 11 is keyed to the driving shaft 8 by a key 57 and may be further secured thereto by a set screw 58 and extends beyond the end 55 of the shaft and carries a sleeve bearing 59 therein which supports the inner end portion of the stub shaft 67, the bearing 59 rotating on the shaft 67.

A pinion 12 having a long hub 60 has rotational bearing on the stub shaft 67 and a relatively large gear 13 is press fitted on the hub 60 to rotate in unison with the pinion 12.

A gear 14 co-axial with the shaft 9 has a hub 15 extending axially therefrom having rotary bearing on the shaft 9 whereby the gear 14 may rotate on the shaft; and the gear 14 is meshed with the pinion 11 and driven thereby. A pinion 16 is rigidly secured on the sleeve 15 and therefore secured to the gear 14 and meshes with the gear 13 and drives it.

A gear 17 is rotatably mounted on the shaft 9 and meshes with the pinion 12 and is driven by it.

In a manner to be described, the gear 17 may be clutched to the shaft 9 by a so-called spring type overrunning clutch by which the gear 17 is rigidly connected to a drum 18 keyed to the shaft 9 which overrunning clutch will presently be described.

Thus when the shaft 8 is driven, it turns the pinion 11 which drives the gear 14 at a reduction of speed; and the gear 14 through the pinion 16 drives the gear 13 at another reduction of speed; and the gear 13 through the pinion 12 drives the gear 17 at a still further reduction of speed; and the gear 17 through the clutch drum 18 drives the shaft 9 at its final reduced speed.

The overrunning clutch above mentioned which will be referred to hereinafter as the low speed clutch will now be described. The drum 18 has a cylindrical surface 19 thereon co-axial with the shaft 9. A helical spring formed from wire, 20, shown separately in Figs. 5 and 6, is telescoped over the cylindrical surface 19.

The spring is of such size that its convolutions frictionally engage cylindrical surface 19. The left end, as viewed in the drawings, is free. The opposite end of the spring 20, as shown at 22, is bent into the axial direction, and is projected into a hole or bore 61 in the gear 17.

When, as above described, the gear 17 is rotated it carries the end 22 of the spring with it and due to the frictional engagement of the spring with the cylindrical surface 19, the spring will be wound up and will positively grip the drum surface 19 and then the rotary movement of the gear 17 is positively transmitted to the drum 18 through the spring and the shaft 9 is driven thereby.

When, in a manner to be described, the shaft 9 is driven at a higher speed than that of the gear 17, the drum 18 rotating with the shaft 9 and inside of the convolutions of the spring 20 will be rotating in the direction to unwind the spring and therefore it will unwind sufficiently to alloy the drum surface 19 to rotate therewithin with a slight frictional engagement therewith but with negligible load drag. The clutch just described therefore may be referred to as an overrunning clutch.

Thus through the gearing above mentioned and through the automatic clutch involving the parts 17, 18 and 20, the shaft 9 will be rotated at a great reduction of speed.

A high speed clutch drum 23 is keyed to the shaft 9 and by means of an operable clutch mechanism now to be described, the high speed drum 23 may be clutched to the gear 14 whereupon the gear 14 will drive the shaft 9 through the drum 23 at a high speed which, in the embodiment as illustrated, will be some reduction from that of the shaft 8 determined by the ratio of the gears 11 and 14. This clutch mechanism will now be described.

A helically wound wire spring 24, shown separately in Figs. 3 and 4, is telescoped over a cylindrical surface 25 on the drum 23. One end 26 thereof is bent radially and connected to the gear 14 in a manner to be more fully described. The other end 27 is bent in the axial direction and is projected into an axially extending bore in an actuating collar 28 having rotary bearing at 29 on the shaft 9.

Thus when the shaft 9 is being driven at low speed as above described, it will be rotating slower than the gear 14, the spring 24 secured thereto and the collar 28 secured to the spring; and these parts will rotate around the shaft 9 and around the drum 23. The inside diameter of the spring 24 is slightly larger than the diameter of the surface 25 of the drum so that the said rotation will be free.

To operate the clutch, the collar 28 is operatively engaged by a mechanism to be described, with the more slowly rotating shaft 9. This slows down the end 27 of the spring and the other end continuing to turn at the higher speed by its engagement with the gear 14 causes the spring to be wound and to grip the cylindrical surface 25 of the drum 23 and to seize thereupon. The drum 23 is thus caused to rotate in unison with the gear 14 and since the drum is keyed to the shaft 9, the shaft 9 is caused to rotate at a higher speed.

To engage the collar 28 with the shaft 9 to operate the high speed clutch as described, the following means is provided.

The shaft 9 is bored out at its left hand end as viewed in the drawings and a plunger 30 is reciprocably mounted therein, the plunger having a portion of reduced diameter 31 at the inner end of the bore 30 and a spring 32 in the bore yieldably holds the plunger 30 toward the left. The plunger 30 is provided with a frusto-conical camming surface 33 inclined to the plunger axis. The shaft has an enlarged flange 34 thereon which is provided with a radial bore 25 in which is radially reciprocably mounted a dog 36. The dog 36 is normally yieldably retained inwardly in its bore 35 by a wire spring 37, one end of which is bent radially as at 38 and projects into a hole in the flange 34. The flange has a groove 39 in which the curvilinear body 40 of the spring 37 is seated, and preferably diametrically opposite or substantially so, from the anchored end 38 of the spring 37 it passes through a slot 62 in the outer end portion of the dog 36.

The collar 28 has a pin 41 driven thereinto radially, the inner end of which projects inwardly into the path of the outer end of the dog 36.

By this arrangement, when the plunger 30 is projected inwardly the dog 36 will be propelled outwardly by the sliding of the inner end thereof on the cam surface 33 of the plunger 30 and during the next revolution of the collar 28, the inner end of the pin 41 will engage and be stopped upon the dog 36 and thus the collar 28 will, as above described, be constrained to rotate at the speed of the shaft 9, for the purpose of setting the clutch as described.

In the preferred construction, the pin 41 is provided with a head 63 on its inner end and the side thereof which is engaged by the dog 36 is bevelled off as at 65 at an angle of preferably 45° with the direction of rotation. Also in the preferred construction, the outer end of the dog 36 where it engages the pin is bevelled off at a corresponding angle, as shown at 64, so that the dog engages the pin on mutually contacting flat surfaces at 45° to the direction of rotation which prevents binding or sticking of these parts at the point of engagement and also causes them to release more positively. When it is desired to release the clutch, and the axially directed operating force is removed from the plunger 30, the spring 32 will exert an axial thrust in the releasing direction; and the spring 40 thrusting the dog 36 inwardly radially over the camming surface 33 will likewise exert an axial thrust on the plunger 30; and finally the driving connection between the dog 36 and the pin 41 on their engaged surfaces being at an angle is in the nature of a wedging engagement so that when the holding pressure on the dog is released, this wedging engagement itself forces the dog inwardly and thus augments the force of the spring 40 and aids in retracting the plunger 30.

The clutch is thus self disengaging and constantly exerts a disengaging force on the dog 36 which supplements the force of the spring to disengage it, and both disengaging forces, namely that of the spring 40 and that of the wedging engagement of the dog with the pin aids in retracting the plunger 30 at the time of disengagement.

To optionally move the plunger 30 toward the right as described to operate the high speed clutch, the following means may be provided. In the lower part of the housing 1 is pivoted the lower end of a lever 42 which is preferably formed from sheet metal and of channel section. The web 43 of the channel may be provided with a large perforation through which the shaft 8 extends. Adjacent the lower pivoted end of the lever a hardened metal button 44 is secured on the web of the channel form lever provided with a hardened planar surface 45. The surface 45 is axially aligned with the outer squared-off end of the plunger 30 which itself may be made from hardened metal, and a ball 46 is disposed between the plunger and the surface 45.

As will now be clear, when the lever 42 is moved clockwise as viewed in the drawings, the high speed clutch will be set and when it is moved counterclockwise the clutch will disengage. The lever 42 may be maintained at a substantially vertical position to keep button 44 in contact with ball 46 in any suitable manner, this being effected as illustrated in Fig. 1, by securing one end of the tension spring to the upper end of lever 42 and securing the opposite spring end to a fixed support.

As will now be clear, when the shaft 9 is being driven at low speed the high speed clutch will be idle or free overrunning and when the shaft 9 is driven at high speed by the high speed clutch, the low speed clutch will be free and overrunning; and the transmission may be changed back and forth from high speed to low speed, as desired.

I have found that the driving at the clutch through the helical spring may be greatly improved as to reliability, durability, and with less liability that the spring will break after continued use, if the spring at the end thereof which receives power is given a few convolutions around a part of the rotating element from which it receives power. To this end, in the case of the spring 24, I provide on the gear 14 a cylindrical surface 51 co-axially of and slightly greater than the outer surface 25 of the drum 23. For convenience of manufacture and compactness of structure, I provide this surface on a ring 50. It is disposed in a recess 49 in the gear 14, the ring being secured to the gear 14 by a plurality, such as two or three pins 52 driven through the gear and into the ring, and the ring may have rotary bearing as at 53 on a hub portion 54 of the drum 23. The spring has the first two or three convolutions always tightly wrapped constrictingly around the cylindrical surface 51 of the ring 50 and always gripping it so that there will not be any slipping or change of diameter of these convolutions of the spring when the spring is operated to grip the slightly smaller diameter of the surface 25; and I find that the advantages, above mentioned, follow from this practice.

Figure 7:
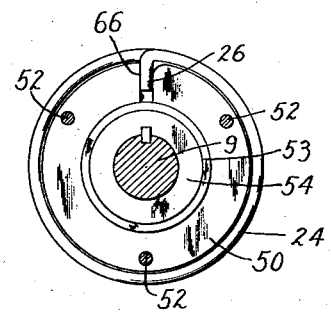
Fig. 7 is a fragmentary sectional view taken from the plane 7 of Fig. 1.

To provide a suitable means to secure the end 26 of the spring 24 to the gear 14, I prefer to provide the arrangement shown in Figs. 1 and 7. The face of the ring 50 adjacent the gear 14 has a substantially radial groove 66 therein and when the ring 50 is in place, this groove constitutes a bore or hole into which the spring end 26 is projected. By providing the wall of the recess 49, as shown in Fig. 1, to overlap the first few convolutions of the spring, there is no liability that the spring end can become detached from the gear.

I have found furthermore that the function of the high speed clutch spring above described will be better performed if the end portions 26 and 27 thereof, anchored as above described, are disposed at diametrically opposite portions of the spring coils.

I have found that the high speed clutch constructed and operated as above described may be caused to engage and remain engaged and drive at high speed with a very slight operating pressure. The necessary operating pressure is determined, not by any characteristics of the clutch spring 24 and the engagement thereof with the driving surface of the drum 23 but by the wedging contact of the dog 36 and pin 41 tending to disengage; and by the tension of the springs 32 and 40, the first of which resists operative movement inwardly of the plunger 30 and the other of which resists outward engaging movement of the dog 36 and these springs may be provided with just enough force to positively and certainly perform their functions.

Inasmuch as the clutch, as above described, may be operated by small force, the device is adapted to be operated by a relatively small electro-magnet by the arrangement shown in Fig. 8. A magnetic frame 67 has a winding 68 therein surrounding a reciprocal plunger 69 having on its inner end a non-magnetic stem 70 carrying a hardened face 71 engaged with the ball 46, above described. When the winding 68 is energized, the magnetic flux acting across an air-gap 72 between the inner end of the plunger 69 and the frame 67 projects the plunger toward the right as viewed in the drawings, which action transmitted through the ball 46 moves the plunger 30 toward the right to operate the clutch as above described.

The frame 67 may be secured to the frame 1, above described, by screws or bolts 73—73.

My invention is not limited to the exact details of the construction illustrated and described. Many changes and modifications may be made within the spirit of my invention and without sacrificing its advantages and within the scope of the appended claims.

I claim:

1. In a power transmission, a driven shaft, a rotary element mounted to rotate co-axially of the driven shaft and arranged to receive power from a power source, clutch mechanism to drivingly connect the rotary element to the driven shaft comprising an intermediate element connected to the shaft to rotate therewith, a helical spring having convolutions surrounding the intermediate element and having one end connected to the rotary element, an actuating element rotatably supported co-axially of the shaft and having the other end of the spring connected thereto, whereby the rotary element and the spring and actuating element all rotate at the same speed, operable means to effect driving connection between the driven shaft and the actuating element to change the speed at said other end of the spring to effect a change of its diameter to cause it to grip the intermediate element and to drive the driven shaft at the speed of the rotating element, said driving connection effecting means comprising a dog rotatable with the shaft and movable transversely thereof into the path of a portion of the actuating element, and operable means to move the dog comprising a plunger movable axially of the shaft and having camming engagement with an inner end portion of the dog to move it upon axial movement of the plunger.

2. In a power transmission, including a driven shaft, a rotary driving element mounted to rotate coaxially of the driven shaft, a clutch mechanism drivingly connecting the rotary element with the driven shaft comprising an intermediate element connected to the shaft to rotate therewith, a helical spring having convolutions surrounding the intermediate element and having one end connected to the rotary element, an actuating element rotatably supported coaxially of the shaft having the other end of the spring connected thereto, whereby the rotary element together with the spring and actuating element will all rotate at the same speed, means to change the rotational speed of the actuating element relative to the rotary driving element to effect a change of spring diameter, and to cause the spring to grip the intermediate element and drive the driven shaft at the speed of the rotary driving element, said driving connecting means comprising a dog rotatable with the shaft and movable transversely thereof into the path of a portion of the actuating element and means to move the dog comprising a plunger movable axially of the shaft and having a camming engagement with an inner end portion of the dog to move it upon an axial movement of the plunger.

3. In a power transmission, including a driven shaft, a rotary driving element mounted to rotate coaxially of the driven shaft, a clutch mechanism drivingly connecting the rotary element with the driven shaft comprising an intermediate element connected to the shaft to rotate therewith, a helical spring having convolutions surrounding the intermediate element and having one end connected to the rotary element, an actuating element rotatably supported coaxially of the shaft having the other spring end connected thereto, whereby the rotary element together with the spring and actuating element all rotate at the same speed, means to alter the speed of the actuating element to change the speed of the spring end connected thereto, to cause a change of the spring diameter and cause the spring to grip the intermediate element to drive the driven shaft at the speed of the rotating element, said driving connecting means comprising a dog rotatable with the shaft and movable transversely thereof against resiliently yieldable means to be disposed in the path of the actuating element, means to move the dog comprising a plunger movable axially of the shaft and having engagement with an inner end portion of the dog to move it by axial movement of the plunger, and resiliently yieldable means adapted to force the dog radially inwardly and the plunger reversely axially upon decrease of the plunger actuating force.

4. In a power transmission, including a driven shaft, a rotary element mounted to rotate coaxially of the driven shaft, a clutch mechanism to drivingly connect the rotary element to the driven shaft comprising an intermediate element secured to the shaft and rotatable therewith, an actuatable element rotatably supported by the shaft, a helical spring having one end connected to the rotary element and several convolutions tightly wound thereon with adjacent convolutions encircling the intermediate element and having the opposite end connected to the actuating element whereby the rotary element together with the spring and actuating element will rotate at a common speed, means engaging the actuating element with the shaft to alter the speed of the spring end connected therewith to cause the spring diameter to be decreased whereby the intermediate element will be gripped by the spring convolutions and the driven shaft will be rotated at the same speed as the rotary element, said means comprising a dog movable transversely of the shaft into engagement with the actuating element, a plunger movable axially of the shaft having camming engagement with the inner end portion of the dog, and an element effecting axial movement of the plunger by a ball bearing connection.

5. In a power transmission, including a driven shaft, a driving element mounted to rotate coaxially of the driven shaft, a clutch mechanism adapted to drivingly connect the rotary element with the driven shaft, comprising an intermediate element connected to the shaft to rotate therewith, a helical spring adapted to loosely encircle the intermediate element and having one end secured to the rotary driving element, an actuating element rotatably supported coaxially of the shaft having the other spring end connected thereto, whereby the rotary driving element together with the spring and actuating element will rotate at the same speed, means to alter the speed of the actuating element and the spring end connected therewith to cause the spring to grippingly engage the intermediate element and drive the driven shaft at the speed of the rotating element, said driving connection means comprising a dog rotatable with the driven shaft and movable transversely thereof to engage the actuating element, and means to effect movement of said dog by pressure directed axially at the driven shaft.

6. In a power transmission, including a driven shaft, a driving element rotatably supported by the driven shaft, a helical spring having one end secured to the driving element and partially telescoped within the driving element with several convolutions thereof tightly engaging a portion of the driving element, an intermediate element rigidly secured to the driven shaft having a portion loosely encircled by the spring convolutions, an actuating element rotatably supported by the driven shaft and having the opposite spring end secured thereto, whereby the driving element together with the spring and actuating element may be rotated at the same speed, the actuating element being recessed and provided with an abutment extending into said recess, the shaft having a portion rotatable within said recess, a dog mounted on said shaft portion and radially movable to engage the actuating element abutment and cause the speed of the spring end connected to the abutment to be altered whereby the intermediate elements will be gripped by the spring to drive the driven shaft at the speed of the driving element, and means for effecting radial movement of the dog to effect said driving connection.

WILLIAM T. WELCH.